Feb. 27, 1940.   G. W. STETSON   2,191,700
LIQUID LEVEL CONTROLLER
Filed April 19, 1938
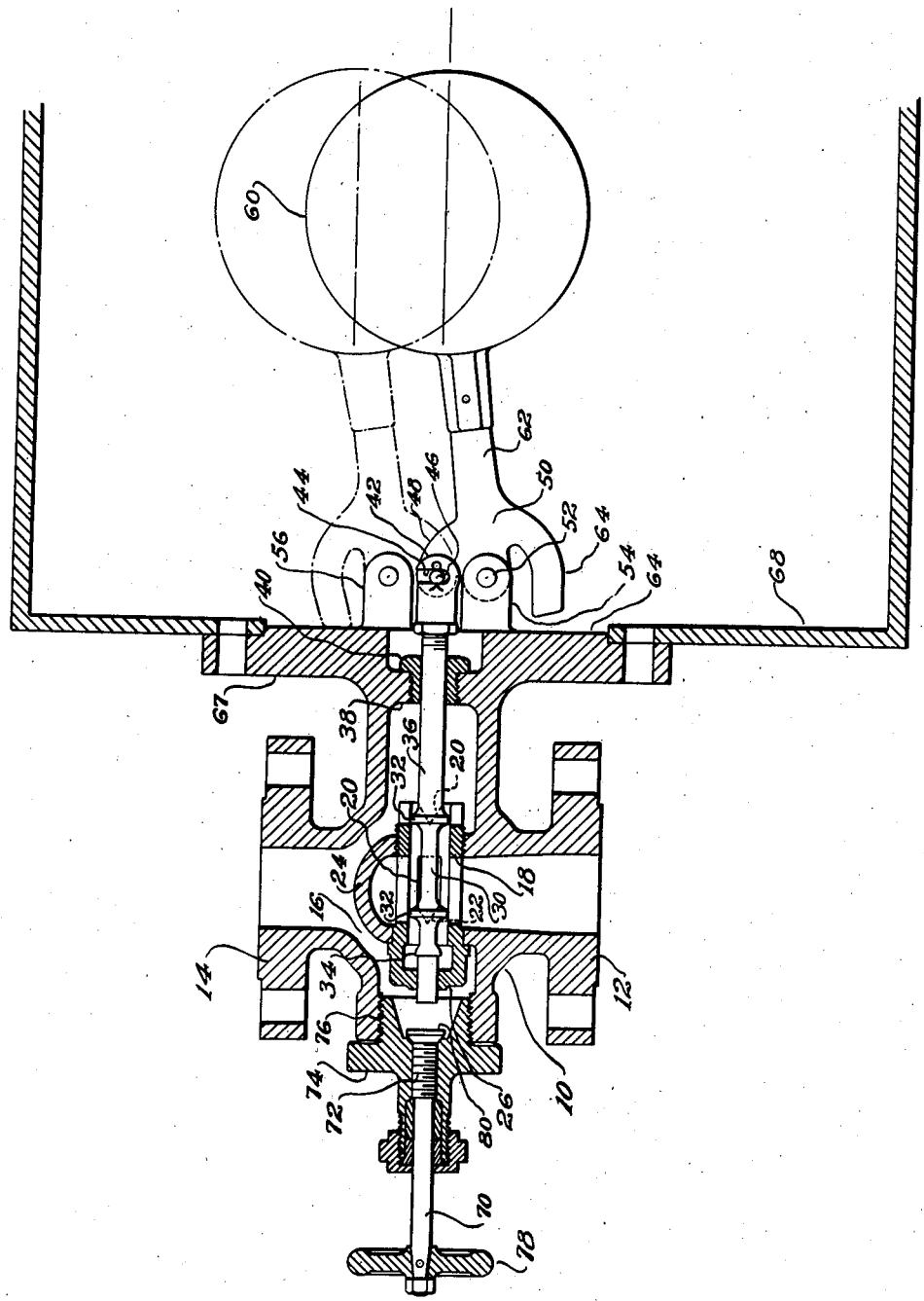
Witness
Paul F. Bryant
Inventor
George W. Stetson
by his Attorney
Fish Hildreth Cary & Jenney Patented Feb. 27, 1940

2,191,700

UNITED STATES PATENT OFFICE 2,191,700

LIQUID LEVEL CONTROLLER

George W. Stetson, Hingham, Mass.

Application April 19, 1938, Serial No. 202,865

2 Claims. (Cl. 137—104)

The present invention relates to liquid level controllers, and more particularly to controllers of this type designed for float actuation.

It is the purpose and object of the invention to provide a liquid level controller which may be operated with equal facility either as a feed controller and regulator cutting off on high level, or as a drainage controller and regulator cutting off on low level of liquid. Obviously the apparatus may be employed equally well as a high or low level alarm or cut-out either in combination with the regulator valve or as a substitute therefor.

With this and other objects in view, the various features of the invention consist in certain novel features of construction, combinations and arrangements of parts hereinafter described and claimed, the advantages of which will be obvious to those skilled in the art from the following description.

The accompanying drawing illustrates a section in elevation of my improved controller or regulator designed for universal usage.

Referring particularly to the illustrated embodiment of the invention, the controller comprises generally a valve casing 10, having attaching flanges 12 and 14 adapted for bolted attachment to the usual feed or drainage line. In ordinary usage when employed as a feed controller, the liquid enters from the bottom, and as a drainage controller the liquid enters from the top. The casing 10 is provided with a valve chamber 16, having detachably mounted therein a sleeve 18 of circular cross-section provided with port apertures 20 which, as indicated, are generally rectangular with V shaped ends 22. The valve cage is threadedly connected within a projection 24 forming part of the valve casing. At its end remote from the float chamber the valve sleeve has a head 26 through which the end of the valve rides and is correspondingly guided.

The valve 30 is of the piston type, fitting within the sleeve and having projections 32 which intercept the ports 20. The valve is provided with a limiting shoulder 34 which stops the movement of the valve in the direction of closing through engagement with the head 26. The piston valve is provided with a stem or operating connection 36 which extends through the wall 38 of the valve chamber into the float region. The wall is provided with a guide bushing 40, which loosely receives the stem, permits free movement thereof, and allows for leakage of cold water from the valve chamber into the float region. The valve stem at its outer projecting end is provided with a bifurcated or forked connection 42 having transverse slots 44 formed therein. These slots receive a trunnion pin 46 mounted in one arm 48 of a pivoted two-arm float lever 50, the end of the lever rocking about a fixed fulcrum constituted by a trunnion pin 52 mounted in between bifurcated lugs 54 or 56 located above and below the extension of the valve stem. A closed float 60 of the usual type is connected to the outer end of the second arm 62 of the bell crank.

By providing the adjustable fulcrum for the float lever, the controller without alteration or substitution of parts may be employed equally well for the control of high or low liquid level. For example, in the form shown in full lines in the drawing, the controller is designed for control of feed water or the like. As the level drops the feed valve is opened, and as the level rises the valve is closed. By disconnecting the bell crank from the projecting end of the valve stem and removing the fixed fulcrum from the lower support 54 to the upper support 56, with a reversal of the bell crank and reconnection to the projecting end of the valve stem, it may be employed equally well as a drainage controller or the like, the valve closing as low water level is approached, this form of construction being illustrated in the dot and dash lines in the drawing.

Movements of the float in a direction tending to open the valve in either case are controlled by a stop arm 64, constituting a third arm of the bell crank and projecting inwardly from below the bell crank toward the wall 65 of the float chamber. As indicated, the controller is provided with an attaching flange 67 for bolting attachment to a tank constituting a float chamber, or directly to a float chamber separate from a boiler or the like, as the case may be. The closed container constituting the float chamber is indicated generally at 68. The valve may be manually moved from closed position through a screw jack 70 threaded at 72 in a head 74, which in turn is threaded at 76 within the valve casing, this jack being provided with a handle 78 for manual operation. As indicated, the inner end of the jack at 80 is aligned with the projecting end of the valve and contacts therewith to forcibly move the valve when actuated from without. The provision of the head 74 also provides convenient access to the valve and valve sleeve for complete removal if so desired through the opening, it being noted that the diameter of the threaded opening within the casing is greater than the diameter of the detachable valve sleeve.

What is claimed is:

1. An assembly for controlling the liquid level in a liquid container comprising a valve casing having a chamber formed therein provided with inlet and outlet ports, a piston movable within said chamber and cooperating with said inlet and outlet ports to prevent flow upon movement of said piston in one direction and to permit flow upon movement of said piston in the opposite direction, an operating stem projecting from said piston outwardly through the wall of said valve casing, fixed fulcrum supports on said wall of the casing at equal distances above and below said projecting stem, a bell crank lever adapted to be pivoted alternatively to either of said fixed fulcrum supports with one arm of said bell crank lever in position and adapted to be operatively connected to said projecting stem, a second arm of said bell crank lever extending outwardly from the lever carrying fulcrum support into a liquid container and supporting a float at its outer end, the movement of said piston to permit flow being thereby responsive to either the rise or fall of said float depending upon which of said fixed fulcrum supports is used, and a third arm of said bell crank lever projecting inwardly toward said wall of the casing and spaced beyond the lever carrying fulcrum support from said valve stem and designed to limit the movement of said bell crank lever by abutment with said wall of the casing.

2. An assembly for controlling the liquid level in a liquid container comprising a valve casing having a chamber formed therein provided with inlet and outlet ports, a piston movable within said chamber and cooperating with said inlet and outlet parts to prevent flow upon movement of said piston in one direction and to permit flow upon movement of said piston in the opposite direction, an operating stem projecting from said piston outwardly through the wall of said casing, an operating connection on the outer end of said stem provided with an open ended generally vertical slot, fixed fulcrum supports on said wall of the casing at equal distances above and below said projecting stem, a bell crank lever adapted to be pivoted alternatively to either of said fixed fulcrum supports with one arm of said bell crank lever in position and adapted to be operatively attached to said slotted connection by means of a pin mounted on said arm and received in said open ended slot to thereby transmit movements of said arm to said stem while permitting relative reciprocation of said pin within said slot, a second arm of said bell crank lever extending outwardly from the lever carrying fulcrum support into a liquid container and supporting a float at its outer end, the movement of said piston to permit flow being thereby responsive to either the rise or fall of said float depending upon which of said fixed fulcrum supports is used.

GEORGE W. STETSON.